Figure 1:
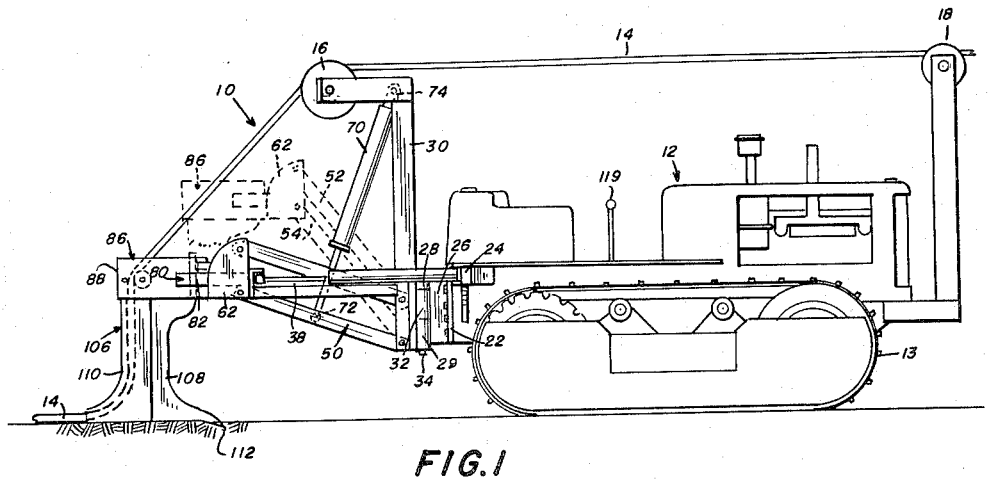

March 30, 1965 P. D. TIBBITS, JR 3,175,368
CABLE LAYING DEVICE

Filed Sept. 26, 1960 2 Sheets-Sheet 1

INVENTOR
PETER DUANE TIBBITS, JR.

BY
ATTORNEYS

March 30, 1965   P. D. TIBBITS, JR   3,175,368
CABLE LAYING DEVICE

Filed Sept. 26, 1960   2 Sheets-Sheet 2

INVENTOR
PETER DUANE TIBBITS, JR.

BY *Fisher Christen & Dodge*

ATTORNEYS

United States Patent Office 3,175,368
Patented Mar. 30, 1965

3,175,368
CABLE LAYING DEVICE
Peter Duane Tibbits, Jr., 515 S. Eton Road,
Birmingham, Mich.
Filed Sept. 26, 1960, Ser. No. 58,339
4 Claims. (Cl. 61—72.6)

This invention relates to a cable laying device and specifically to a device for use with a track laying vehicle to accurately lay telephone cable and the like several feet below the earth's surface.

For landscape harmony and long-term economic reasons, it has become increasingly advantageous to lay electrical and telephone cables and the like below the earth's surface rather than stringing them on poles. Since the cable, once laid below the earth's surface, cannot be seen by the eye, it is very important that it be positioned accurately so that is can be easily found in case it needs repair and that future earth moving operators will be able to avoid it.

The governmental agencies responsible in most instance lay down strict rules as to where and to what accuracy such cables are to be laid. For instance, the layer's specifications will call for the cable to be laid exactly so many feet from the crown or the edge of a road. Bucket-type ditch digging equipment, although capable of traveling in a relatively straight line, are slow and are not economical, in most situations for the laying of cable. In the art there has been developed V-shaped plows which are pulled through the earth's surface and have means whereby a cable can be received between the blades of the plow and retained at the bottom of the ditch as the plow moves forwardly. This method has the advantage of speed and requires very little refilling of the ditch after the cable has been laid.

However, in many environments, while using such equipment it is difficult to maintain the attitude of the track laying vehicle in proper directional alignment. In some conditions, one track may be on gravel and one on grass; which means the operator must constantly adjust the speed of the tracks in order to maintain the proper directional travel of the plow. In other instances, the tractor may be on a relatively steep grade (transverse to the direction of the road) which requires the operator to "yaw" his vehicle angularly to the direction of travel so that the plow follows the correct directional line. Such driving maneuvers require the most skillful of operators and are very tiring over long periods of time.

It is, therefore, an objective of this invention to provide a means whereby a cable laying plow may be accurately maintained in its designated course of travel without burdensome and difficult operator maneuvers. This objective is obtained generally by providing apparatus which will cause the plow to act as a rudder below the earth's surface so that the vehicle operator may set his tracks at equal speeds and merely maintain a direction of travel by operating the angular deflection of the cable-laying plow.

A further objective of this invention is to provide a novel framing and hydraulic apparatus which permits the cable laying plow to be maneuvered in such a manner that the blade maneuvers the vehicle rather than the vehicle maneuvering the blade.

Another important objective of my invention is to provide cable laying equipment which will lay cable in difficult terrain and conditions with an accuracy and speed heretofore thought unattainable.

Further objectives and advantages of this invention will be apparent from the following description and claims, wherein the construction, arrangement and cooperation of the several parts of the apparatus are set forth.

Figure 2:
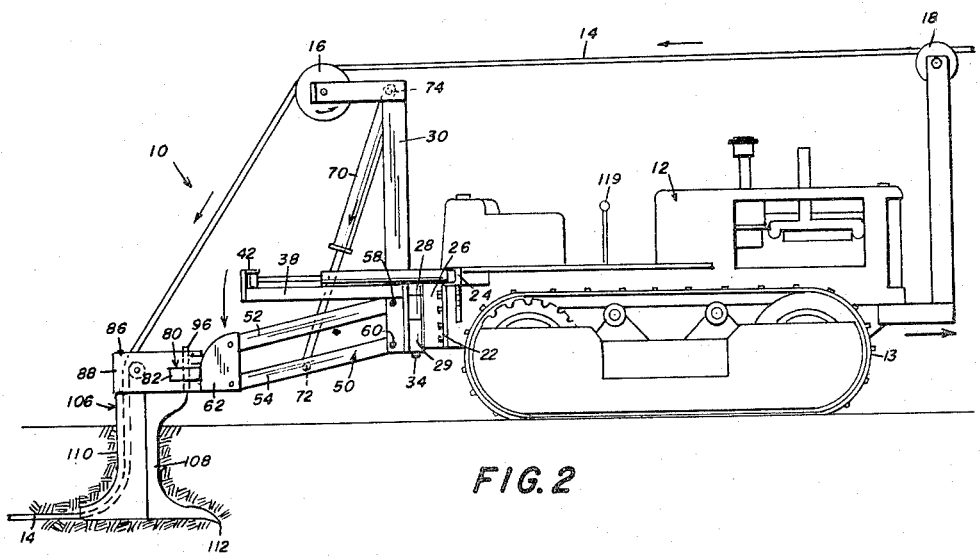
Figure 3:
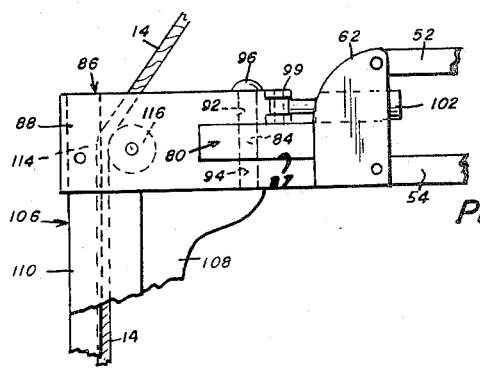
Figure 4:
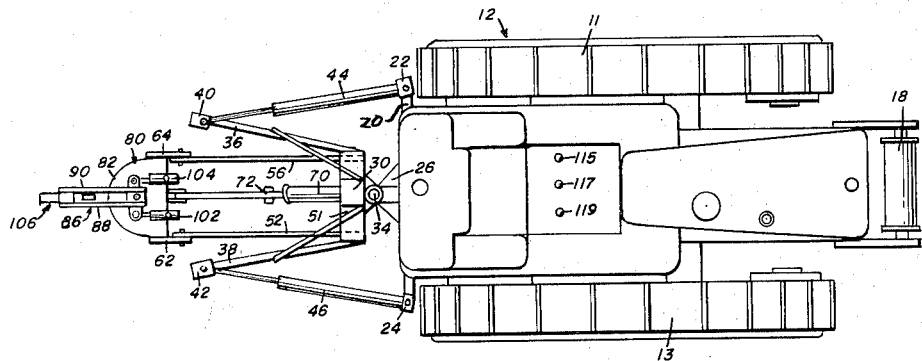
Figure 5:
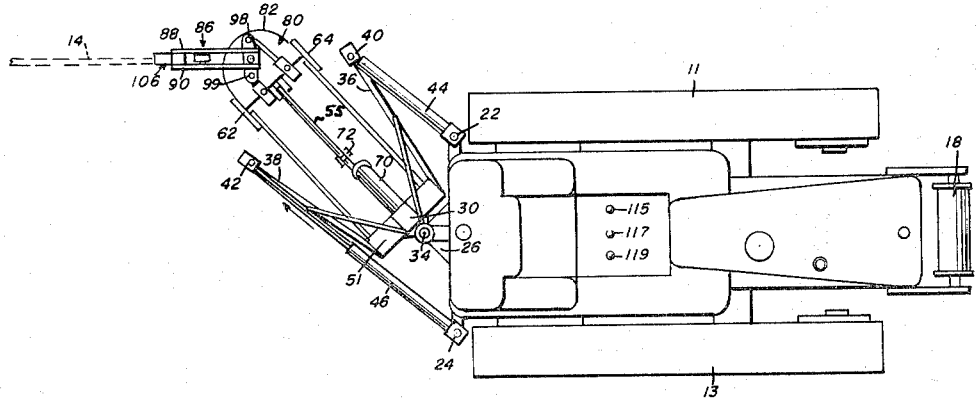
Figure 6:
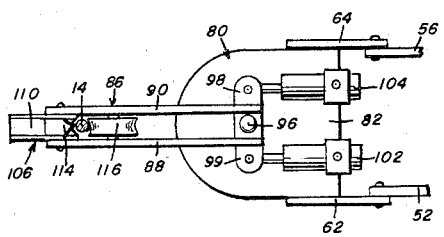

In the drawings:
FIG. 1 is an elevation view showing the blade just prior to entry into the earth's surface;
FIG. 2 is a view like FIG. 1 showing the blade in its operable position.
FIG. 3 is a partial enlarged elevation view of a portion of the invention.
FIG. 4 is a plan view (with cable guide roller omitted) showing the blade directly in line with the longitudinal axis of the vehicle and with the direction of travel;
FIG. 5 is a plan view (cable guide roller omitted) showing the rudder plow in an exaggerated operable position; and
FIG. 6 is an enlarged plan view of a portion of the plow assembly.

Referring now to the drawings where like elements indicate like parts, the numeral 10 indicates the plow assembly of this invention. The assembly is supported, and adapted to be pulled, by a conventional track laying vehicle 12.

In the embodiment and operation being described, a cable 14 has been previously laid along the ground, approximately over the line of ditching, and has been lifted over pulleys 16 and 18 which are supported by the vehicle 12. It is to be understood that the pulley 16 could be substituted by a cable reel and the cable laid directly from the reel, if desired.

The assembly 10 includes a bracket 20 firmly affixed across the rear of vehicle 12 and is terminated at pivot supports 22 and 24. Centrally of the bracket 20 is a rearwardly extending tongue 26 having a plurality of vertically arranged pintle receiving loops 28 and 29.

A standard 30 has a forwardly extending pintle-receiving loop 32 adapted to fit between and in alignment with loops 28 and 29. A pintle pin 34 pivotally secures the standard and the structure supported there to the bracket.

Welded or otherwise secured to the standard 30 are a pair of outwardly angularly extending arms 36 and 38. A pair of pivot connections 40 and 42 are at the outward ends of these arms. Two heavy duty hydraulic jacks 44 and 46 connect the pivot points 40 and 42, respectively, to pivot points 22 and 24. Through the controlled operation of jacks 44 and 46, it can be seen that the frame comprising standard 30 and arms 36 and 38 may be pivoted about pintle 36.

A second framing assembly generally designated as 50 is adapted to be vertically pivoted with respect to the first framing structure. The assembly 50 is comprised basically of four arms; 52, 54, 56 and 58 (arm 58 not shown but in a similar position as arm 54). A flanged support member 51 welded to the bottom of standard 30 provides the principal support for this second framing assembly. The arms 52 and 54 are pivotally mounted to one end of member 51 on pins 58 and 60. The arms 56 and 58 are pivoted to the other end of member 51 in a similar position. The outer ends of arms 52 and 54 are pivotally secured to a plate 62, and the outer ends of arms 56 and 58 are likewise pivotally secured to a plate 64. The resulting structure is a pair of parallelogram linkages, one of which is comprised of arms 50 and 52, plate 62, and a portion of framing member 51, and the other of which is comprised of arms 56, 58, plate 64 and, again, the other end of member 51.

A hydraulic jack 70 has its piston rod end pivotally attached at 72 to a member 55 parallel and between the parallelogram linkages, and the cylinder end thereof attached near the top of standard 30 at point 74. As seen in FIGS. 1 and 2, and particularly in the dotted lines in FIG. 1, the second framing assembly may be raised and lowered through the action of hydraulic jack 70. As the assembly is raised the parallelogram linkages close, and as the assembly is lowered it opens.

Mounted between plates 62 and 64 is still a third frame generally designated by the numeral 80. This framing 80 is comprised of a disc 82 secured to the inner faces of plates 62 and 64 and has an aperture 84 therethrough. A plow support 86 has parallel extensions 88 and 90 which receive the disc 82 in a groove 87. The extensions have axial spaces 92 and 94 adapted to align with the aperture 84. A pintle 96 is inserted through the three apertures so that the mounting 80 is pivotally secured.

On the outward sides of extensions 88 and 90 are outwardly extending lugs 98 and 99. A pair of further hydraulic jacks 102 and 104 are pivotally connected to lugs 98 and 99 pivotally and connected to disc 82. As best seen in FIGS. 3 and 4, these hydraulic jacks can control the movement of plow support 86 about pintle 96. Fixedly secured to support 86 is the plow member 106. The plow member is comprised of two basic parts; a leading plow edge 108 and a V-shaped or parallel plate cable retainer trailing section 110. The lead edge 108 is formed with a slightly downturned nose 112 so that the plow will easily enter the earth's surface as the vehicle moves forward. The V-shaped or parallel plate cable retaining section has conventional mechanism therein such as a swingable block 114 and roller 116 to retain the cable between its blades during operation.

The operation of the invention is quite apparent. Referring to FIG. 1, the apparatus is shown just prior to the entry of the plow penetrating the ground. A previously laid-out cable is lifted onto pulleys 16 and 18 and threaded between the blades of V-shaped section 110. As the vehicle moves forward as shown in FIG. 2, the hydraulic jack 70 is extended and the plow is lowered to a desired or designated depth. The design of the nose 112 will cooperate with the jack to facilitate the blade reaching its desired depth. The jack 70 is then secured in this position. The operator may now set his tracks 11 and 13 to travel at equal speeds and control the steering of the vehicle by use of the conventional hydraulic control levers 115, 117, and 119. The hydraulic controls necessary to connect the control levers to the jacks are well known to those skilled in the art and by themselves are not within the scope of this invention.

The plow, through its angular deflections, can now control the vehicle, rather than the conventional practice of having the vehicle maneuver the plow. The general course of travel can be set through the action of cylinders 44 and 46 and fine adjustments may be made through the action of cylinders 102 and 104. The skilled operator readily becomes acquainted with the best steering combination to use under varied conditions. When the laying operation has been completed, the hydraulic jack 70 is merely retracted to the position shown in dotted lines in FIG. 1.

In a general manner, while I have, in the above description, disclosed what I deem to be practical and efficient embodiments of my invention, it should be well understood that I do not wish to be limited thereto, as there might be changes made in the arrangement, disposition and form of the parts without departing from the principle of the present invention as comprehended within the scope of the accompanying claims.

I claim:

1. In cable laying vehicles, the combination including, frame means, plow means, and elongated suspension means including first and second pivot means, said suspension means being connected with the frame means by said first pivot means for movement about a first vertical axis and a horizontal axis, said plow means being connected with the suspension means by said second pivot means for movement about a second vertical axis and a second horizontal axis substantially parallel with said respective first vertical and horizontal axes.

2. In combination with a self-powered mobile vehicle movable over the ground in a given direction and steerable about a given vertical axis, the combination including, cable laying plow means including a substantially flat member moved by the vehicle through the soil, attachment means mounting the plow means on said mobile vehicle, said attachment means including means positioning said flat member in a vertical plane generally parallel with the direction of movement of the vehicle and horizontally spaced from said vertical axis of steering, said attachment means also including shifting means to move said flat member horizontally transversely with respect to said direction of movement and to turn the flat member about a vertical axis to maintain it parallel with said direction of movement when the vehicle moves about said vertical steering axis.

3. The invention as defined in claim 2, wherein said shifting means includes power actuated means exerting a horizontal component of force between said flat member and said mobile vehicle to assist in steering said vehicle.

4. The invention as defined in claim 3, wherein said shifting means includes an elongated element pivotally connected at its ends to said mobile vehicle and to said flat member respectively and said power-actuated means includes cylinder and piston means pivotally connected between said elongated element and said vehicle, said pivotal connection with the vehicle being horizontally spaced from the pivotal connection between said elongated element and the vehicle.

References Cited in the file of this patent

UNITED STATES PATENTS

| | | |
|---|---|---|
| 2,414,994 | Wright | Jan. 28, 1947 |
| 2,663,515 | Kinsinger | Dec. 22, 1953 |
| 2,766,536 | Perkins | Oct. 16, 1956 |
| 2,788,906 | Davis | Apr. 16, 1957 |
| 2,797,629 | Kelley | July 2, 1957 |
| 2,900,931 | Lisle | Aug. 25, 1959 |
| 2,931,446 | Gwinn | Apr. 5, 1960 |
| 3,032,903 | Ede | May 8, 1962 |
| 3,060,696 | Lang | Oct. 30, 1962 |